United States Patent [19]

Hiraishi

[11] Patent Number: 5,613,104
[45] Date of Patent: Mar. 18, 1997

[54] SERIAL TRANSMISSION APPARATUS HAVING AN OPERATION SURELY CARRIED OUT EVEN IF A SERIAL DATUM IS REPRESENTED BY AN UNKNOWN NUMBER OF DATA BITS

[75] Inventor: Ayako Hiraishi, Tokyo, Japan

[73] Assignee: NEC Corporation, Tokyo, Japan

[21] Appl. No.: 330,839

[22] Filed: Oct. 27, 1994

[30] Foreign Application Priority Data

Oct. 29, 1993 [JP] Japan ..................... 5-271096

[51] Int. Cl.⁶ ..................... G06F 13/38
[52] U.S. Cl. ............. 395/557; 395/854; 395/877
[58] Field of Search ................ 395/550, 849, 395/852, 854, 877–879

[56] References Cited

U.S. PATENT DOCUMENTS 4,542,457  9/1985  Mortensen et al. ............... 395/849
5,274,764 12/1993  Kim ................................. 364/DIG. 1
5,390,299  2/1995  Rege et al. ...................... 364/DIG. 1
5,455,913 10/1995  Shrock et al. ................... 364/DIG. 1
5,485,583  1/1996  Cunningham et al. ................ 395/845

Primary Examiner—Thomas M. Heckler
Attorney, Agent, or Firm—Foley & Lardner

[57] ABSTRACT

For surely carrying out interruption operation of a serial transmission apparatus responsive to a serial datum even if the serial datum is represented by an unknown number of data bits transmitted in series, an interruption signal producing circuit produces an interruption request signal in response to at least one of an overflow signal and an end signal which is representative of an end of the serial datum. Supplied with the serial datum, a shift register memorizes the serial datum within a predetermined bit length. When the shift register is filled with the serial datum, a counter produces the overflow signal. Responsive to the interruption request signal, an interruption circuit carries out the interruption operation to process the memorized datum.

6 Claims, 4 Drawing Sheets

SERIAL TRANSMISSION APPARATUS HAVING AN OPERATION SURELY CARRIED OUT EVEN IF A SERIAL DATUM IS REPRESENTED BY AN UNKNOWN NUMBER OF DATA BITS

BACKGROUND OF THE INVENTION

This invention relates to a serial transmission apparatus of a clock-synchronous type. Such a serial transmission apparatus is responsive to a serial datum represented by a predetermined number of data bits which are transmitted in series.

In the manner which will be described in the following, a conventional serial transmission apparatus comprises a shift register and a data processing circuit. The shift register has a predetermined bit length and is for memorizing the serial datum as a memorized datum within the predetermined bit length. The processing circuit is for processing the memorized datum in response to an interruption request signal which will later be described.

When the serial transmission apparatus receives the serial datum that is transmitted from another serial transmission apparatus, the shift register carries out a first predetermined operation to memorize the serial datum as the memorized datum. When the serial datum is memorized in the shift register so that the data bits have a number corresponding to the predetermined bit length, the data processing circuit processes the memorized datum as a parallel datum known in the art. After that, the shift register carries out the first predetermined operation again.

In this connection, description will be directed to a particular case where the serial transmission apparatus transmits the serial datum towards the other serial transmission apparatus. In the particular case, the data processing circuit forwards the parallel datum to the shift register. After memorized with the parallel datum as the memorized datum, the shift register carries out a second predetermined operation to send out the memorized datum as the serial datum. When the shift register becomes idle, the data processing circuit forwards the parallel datum to the shift register. After that, the shift register carries out the second predetermined operation again.

In the manner which will be described in the following, the serial transmission system further comprises a clock producing circuit, a counter, and a signal producing circuit. The pulse producing circuit is for producing serial clocks in the manner known in the art. The counter is for counting up a counted value in accordance with each of the serial clocks to produce an overflow signal when the counted value becomes equal to a predetermined count value which corresponds to the predetermined bit length. The signal producing circuit is for producing the above-mentioned interruption request signal in response to the overflow signal.

It is assumed here that production of the serial clocks is stopped before the counted value becomes equal to the predetermined count value in a specific case where the serial datum has a data bit length less than the predetermined bit length of the shift register. When the production of the serial clocks is stopped, the counter does not produce the overflow signal even when the serial datum is completely memorized as the memorized datum in the shift register. As a result, the signal producing circuit does not produce the interruption request signal in the specific case as will later be described with reference to the figure. Therefore, the data processing circuit does not process the memorized datum.

SUMMARY OF THE INVENTION

It is therefore an object of this invention to provide a serial transmission apparatus which has a predetermined operation surely carried out even if a serial datum is represented by an unknown number of data bits.

Other objects of this invention will become clear as the description proceeds.

According to an aspect of this invention, there is provided a serial transmission apparatus responsive to a serial datum represented by a plurality of data bits which are transmitted in series with a predetermined time interval therebetween. The serial transmission apparatus comprises data memorizing means for memorizing the serial datum as a memorized datum, overflow signal producing means operatively connected to the data memorizing means for producing an overflow signal when the data memorizing means is filled with the memorized datum, end signal producing means operatively connected to the data memorizing means for producing an end signal when elapsing of time is greater than the predetermined time interval after the data memorizing means memorizes a latest one of the data bits, interruption request signal producing means connected to the overflow signal producing and the end signal producing means for producing an interruption request signal in response to at least one of the overflow signal and the end signal, and data processing means connected to the data memorizing and the interruption request signal producing means for processing the memorized datum in response to the interruption request signal.

According to another aspect of this invention, there is provided a serial transmission apparatus responsive to a serial datum represented by a plurality of data bits which are transmitted in series with a predetermined time interval therebetween. The serial transmission apparatus comprises a clock input terminal for being supplied with an original clock signal relating to the serial datum, clock producing means connected to the clock input terminal for producing serial clocks in accordance with the original clock signal, a shift register having a predetermined bit length for memorizing the serial datum as a memorized datum within the predetermined bit length, a counter connected to the clock producing means for counting up a counted value in accordance with each of the serial clocks to produce an overflow signal when the counted value becomes equal to a predetermined count value which corresponds to the predetermined bit length, and first producing means connected to the clock input terminal and the counter for producing an end signal by the use of the original clock signal, the counted value, and a particular time interval which is greater than the predetermined time interval. The end signal is representative of an end of the serial datum. The serial transmission apparatus further comprises second producing means connected to the counter and the first producing means for producing an interruption request signal in response to at least one of the overflow signal and the end signal and data processing means connected to the shift register and the second producing means and responsive to the interruption request signal for processing the memorized datum that is memorized in the shift register.

According to still another aspect of this invention, there is provided a method of processing a serial datum represented by a plurality of data bits which are transmitted in series with a predetermined time interval therebetween. The method comprises the steps of memorizing the serial datum as a memorized datum, producing an overflow signal when the data memorizing means is filled with the memorized datum, producing an end signal when elapsing of time is greater than the predetermined time interval after the data memorizing means memorizes a latest one of the data bits, producing an interruption request signal in response to at least one of the overflow signal and the end signal, and processing the memorized datum in response to the interruption request signal.

DESCRIPTION OF THE PREFERRED EMBODIMENT

Figure 1:
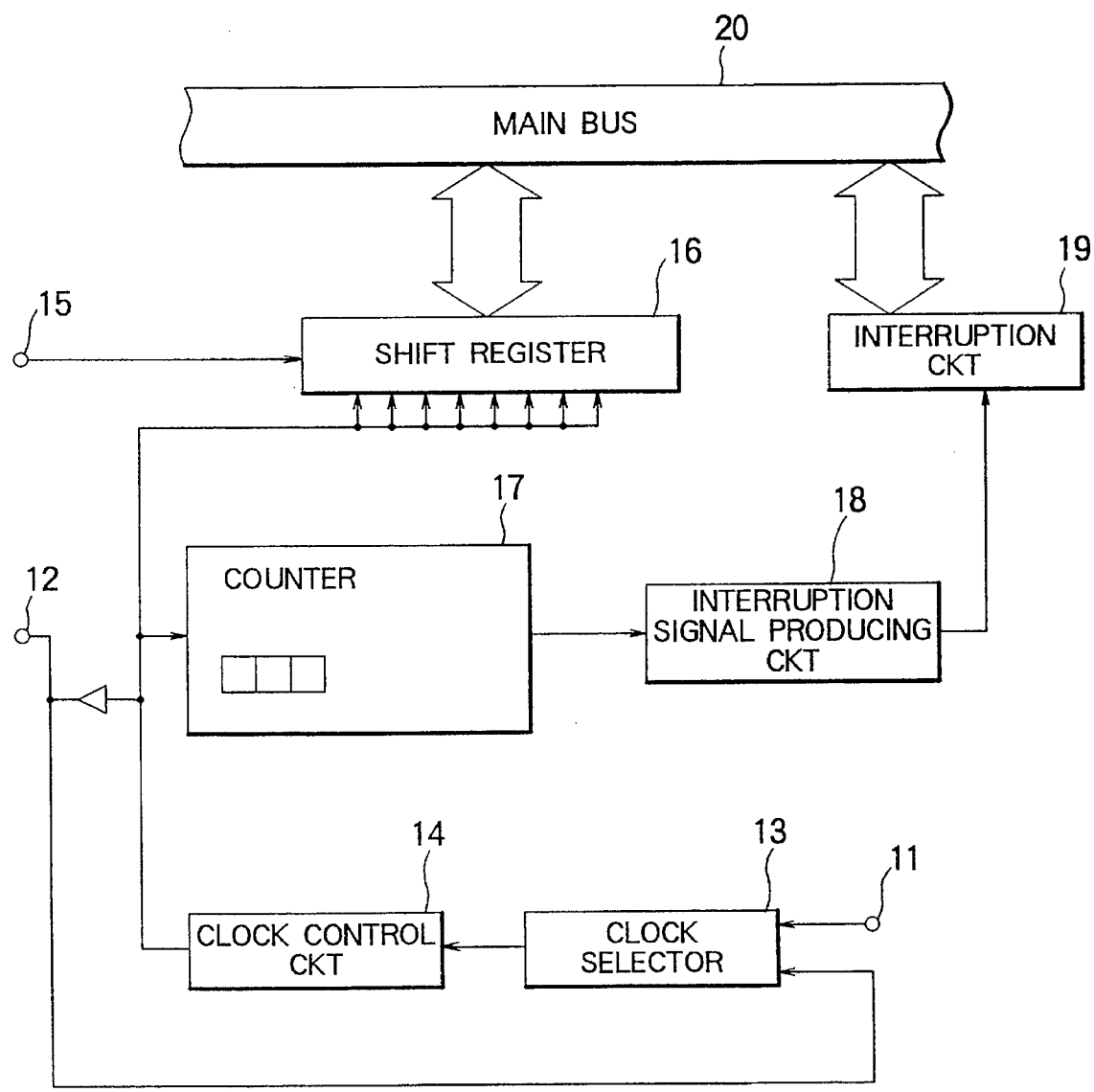
FIG. 1 is a block diagram of a conventional serial transmission apparatus.

Referring to FIG. 1, a conventional serial transmission apparatus will be described at first for a better understanding of the present invention. The conventional serial transmission apparatus is responsive to a serial datum (D) represented by a particular number (m) of data bits which are transmitted in series with a predetermined time interval therebetween.

In the manner which will be described in the following, the conventional serial transmission apparatus comprises an internal clock input terminal 11, an external clock input terminal 12, a clock selector 13, and a clock control circuit 14. The internal clock input terminal 11 is supplied with an internal clock signal (CKI) known in the art. The external clock input terminal 12 is supplied with an external clock signal (CKE) known in the art. Each of the internal and the external clock signals will be referred to as an original clock signal relating to the serial datum. The clock selector 13 is connected to the internal and the external clock input terminals 11 and 12 and is for selecting, as a serial clock signal, one of the internal and the external clock signals. The clock control circuit 14 is connected to the clock selector 13 and supplied with the serial clock signal. On starting a reception of the serial datum, the clock control circuit 14 produces serial clocks in accordance with the serial clock signal. A combination of the internal clock input terminal 11, the external clock input terminal 12, the clock selector 13, and the clock control circuit 14 is referred to as a pulse producing arrangement.

The conventional serial transmission apparatus further comprises a data input terminal 15, a shift register 16, a counter 17, an interruption signal producing circuit 18, and an interruption circuit 19. The data input terminal 15 is supplied with the serial datum. The shift register 16 has a predetermined bit length corresponding to a predetermined number (n) of bits and is connected to the clock control circuit 14 and the data input terminal 15. In accordance with each of the serial clocks, the shift register 16 memorizes the serial datum as a memorized datum within the predetermined bit length. In other words, the shift register 16 carries out a shift-in about the serial datum in response to a leading edge of each of the serial clocks with converting the serial datum to a parallel datum. The shift register 16 is referred to as a data memorizing arrangement. The counter 17 is connected to the clock control circuit 14 and is for counting up a counted value in accordance with each of the serial clocks. More particularly, the counter 17 counts the serial clocks that are supplied from the clock control circuit 14. When the counted value represents the predetermined number (n), the counter 17 produces an overflow signal. In other words, the overflow signal is produced when the counter 17 counts the serial clocks to become equal to the predetermined number (n). The counter 17 is referred to as an overflow signal producing arrangement. Responsive to the overflow signal, the interruption signal producing circuit 18 produces an interruption request signal (RI). Responsive to the interruption request signal, the interruption circuit 19 processes the memorized datum that is memorized in the shift register 16. More particularly, the interruption circuit 19 carries out a predetermined interruption operation of the memorized datum through a main bus 20 in the manner known in the art.

It is assumed as a particular case that the particular number (m) is less than the predetermined number (n) when the clock selector 13 selects the external clock signal as the serial clock signal. In the particular case, the clock control circuit 14 stops production of the serial clocks before the count value represents the predetermined number (n). The counter 17 does not produce the overflow signal, so that the interruption signal producing circuit 18 does not produce the interruption request signal. Therefore, the interruption circuit 19 cannot carry out the predetermined interruption operation.

In this connection, the description will be directed to a specific case where the clock selector 13 selects the internal clock signal as the serial clock signal with the particular number (m) being less than the predetermined number (n). In the specific case, the clock control circuit 14 produces the serial clocks until the count value represents the predetermined number (n). The counter 17 produces the overflow signal when the count value represents the predetermined number (n). In the manner known in the art, reception of the serial datum is carried out about effective data of (m)-bits and reactive data of (n-m)-bits. As a result, the interruption signal producing circuit 18 produces the interruption request signal. Therefore, the interruption circuit 19 carries out the predetermined interruption operation.

Figure 2:
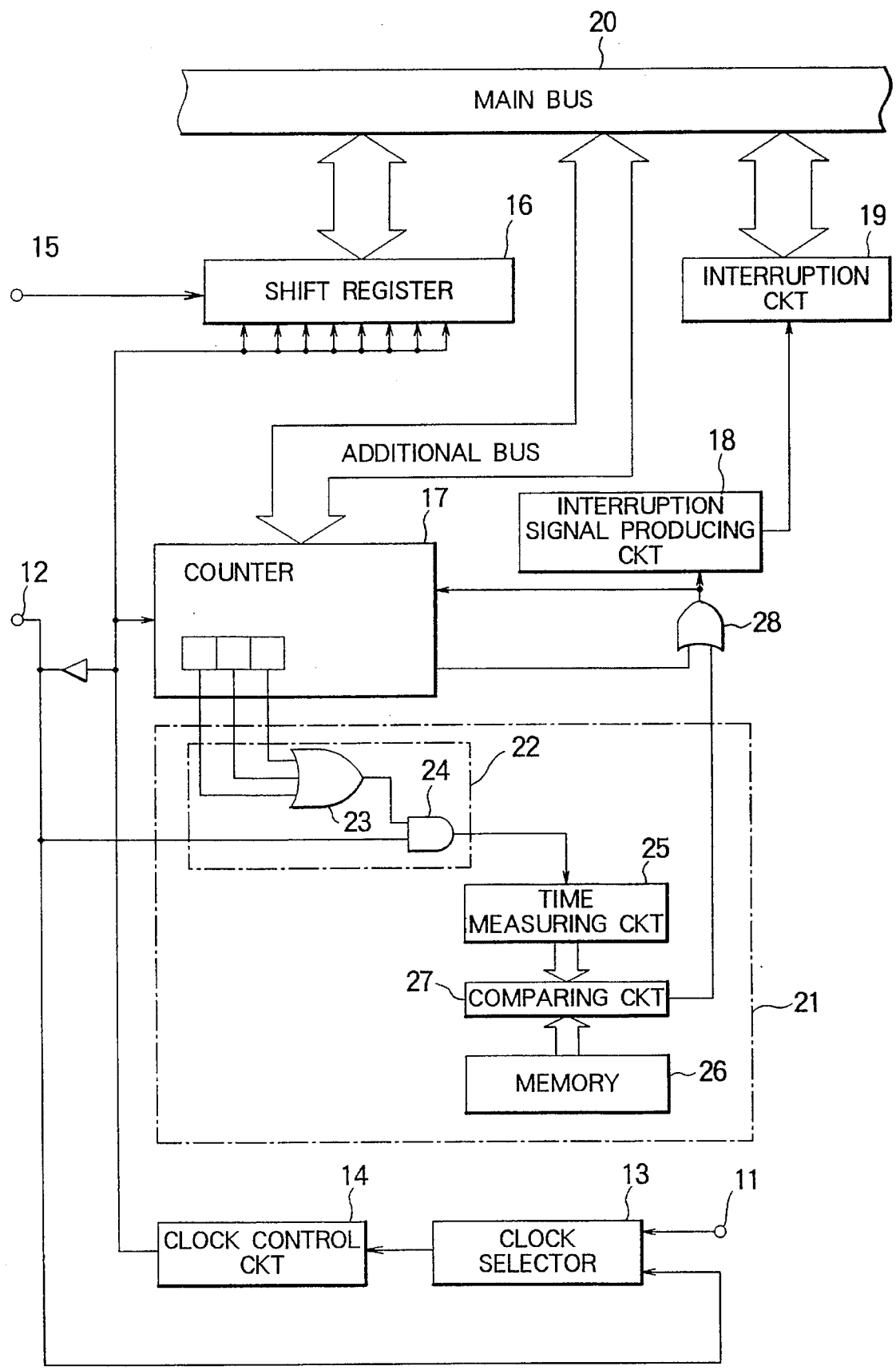
FIG. 2 is a block diagram of a serial transmission apparatus according to an embodiment of this invention.
Figure 3:
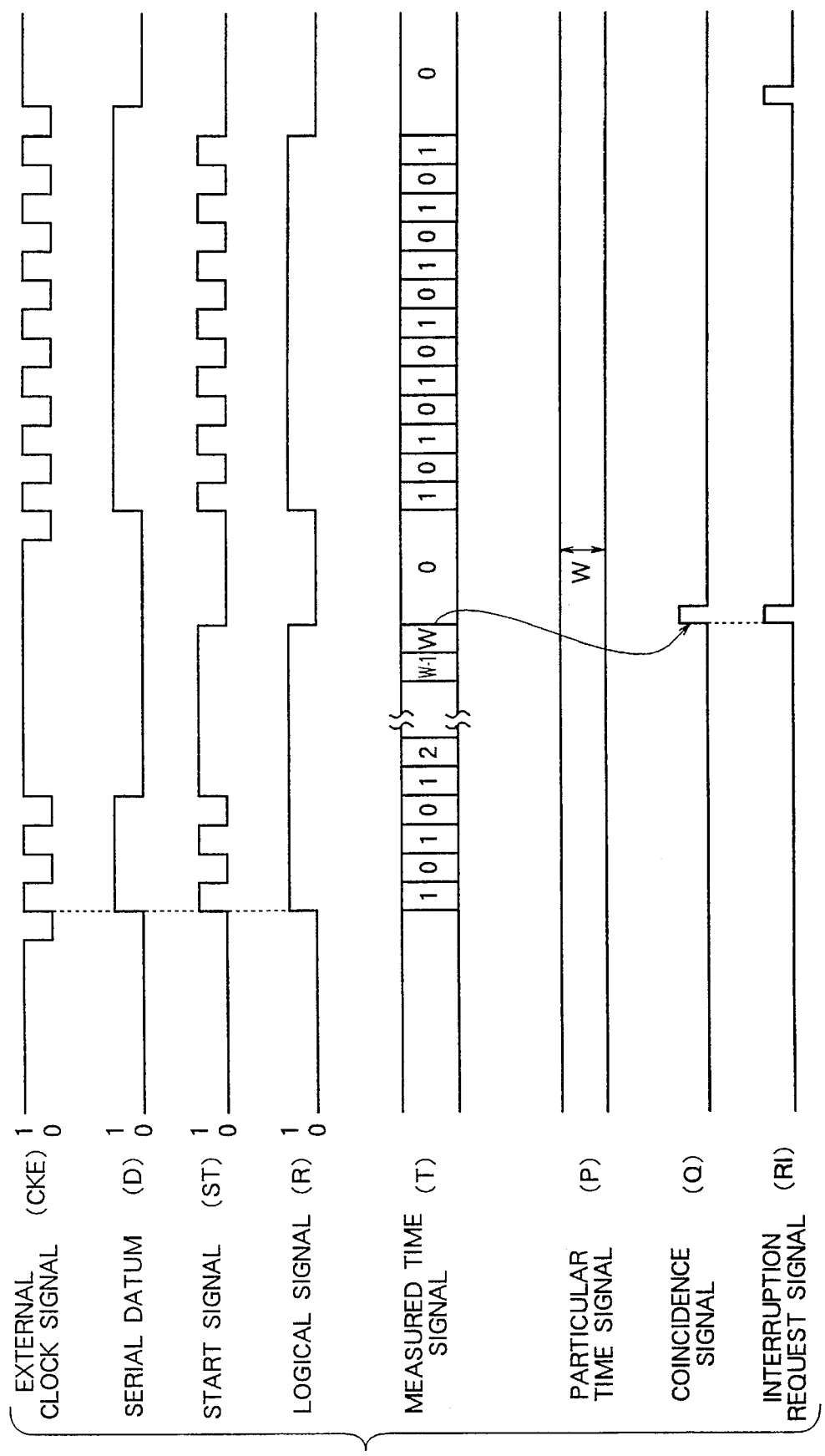
FIG. 3 is a time chart for use in describing operation of the serial transmission apparatus of FIG. 2.

Turning to FIGS. 2 and 3, the description will be directed to a serial transmission apparatus according to an embodiment of this invention. The serial transmission apparatus comprises similar parts designated by like reference numerals.

The serial transmission apparatus further comprises an end signal producing circuit 21 connected to the external clock input terminal 12 and the counter 17. In the manner which will be described in detail in the following, the end signal producing circuit 21 is for producing an end signal by the use of the external clock signal, the counted value, and a particular time interval (W) which is greater than the predetermined time interval and is selectively determined by an operator or a user. The end signal producing circuit 21 is referred to as a first producing arrangement or an end signal producing arrangement. The external clock signal has a logic "0" level in relation to presence of the serial datum. Otherwise, the external clock signal represents a logic "1" level.

The end signal producing circuit 21 comprises a start signal producing circuit 22 connected to the external clock input terminal 12 and the counter 17. The start signal producing circuit 22 is for producing a start signal (ST) in response to the external clock signal and the counted value and comprises an OR gate 23 and an AND gate 24. The OR gate 23 is connected to the counter 17 and is for detecting the counted value of the counter 17. When the counter 17 starts a counting up of the counted value, the OR gate 23 has a logical signal (R) of a logic "1" level. When the counted value is zero, the OR gate output signal has a logic "0" level. The AND gate 24 is connected to the external clock input terminal 12 and the OR gate 23 and is for producing the start signal of a logic "1" level only when both of the logical and the external clock signals represent the logic "1" level.

The end signal producing circuit 21 further comprises a time measuring circuit 25, a memory 26, and a comparing circuit 27. The time measuring circuit 25 is connected to the AND gate 24 and is for measuring a time in response to the logic "1" level of the start signal to produce a measured time signal (T) representative of a measured time interval corresponding to a lapse of the time. When the start signal represents the logic "1", the time measuring circuit 25 makes the measured time signal represent the measured time interval of one which is depicted by a symbol "1" in FIG. 2. When the start signal becomes the logic "0" level, the time measuring circuit 25 makes the measured time signal represent the measured time interval of zero which is depicted by a symbol "0" in FIG. 2. When the start signal continuously represents the logic "1" level during a time which is longer than the predetermined time interval, the time measuring circuit 25 makes the measured time interval be gradually increased as depicted by symbols "2" through "W" in FIG. 2. The memory 26 is for memorizing to determine a predetermined time interval as the reference value for the serial datum. The memory 26 will be referred to as a time determining arrangement. The comparing circuit 27 is connected to the time measuring circuit 25 and the memory 26 and is responsive to the measured time signal and the particular time signal for comparing the measured time interval with the particular time interval. When the measured time interval becomes equal to the particular time interval, the comparing circuit 27 produces a coincidence signal (Q) which is supplied to the interruption signal producing circuit 18.

The serial transmission apparatus further comprises an OR gate 28 connected to the counter 17, the interruption signal producing circuit 18, and the comparing circuit 27. The OR gate 28 is for producing a local signal in response to at least one of the overflow signal and the end signal. The local signal is supplied to the counter 17 and the interruption signal producing circuit 18. Responsive to the local signal, the counter 17 makes the counted value become equal to an initial value. On the other hand, the interruption signal producing circuit 18 processes the local signal into the interruption request signal (RI) in the manner known in the art. The OR gate 28 will be referred to as a local signal producing arrangement. The interruption signal producing circuit 18 will be referred to as a local processing arrangement. A combination of the OR gate 28 and the interruption signal producing circuit 18 is referred to as a second signal producing arrangement.

The serial transmission apparatus further comprises an additional bus 29 connected to the counter 17 and the main bus 20. The additional bus 29 is for enabling the counted value be read from the counter 17. In other words, an operator can read the counted value through the main and the additional buses 20 and 29. A combination of the main and the additional buses 20 and 29 will be referred to as a reading bus.

Figure 4:
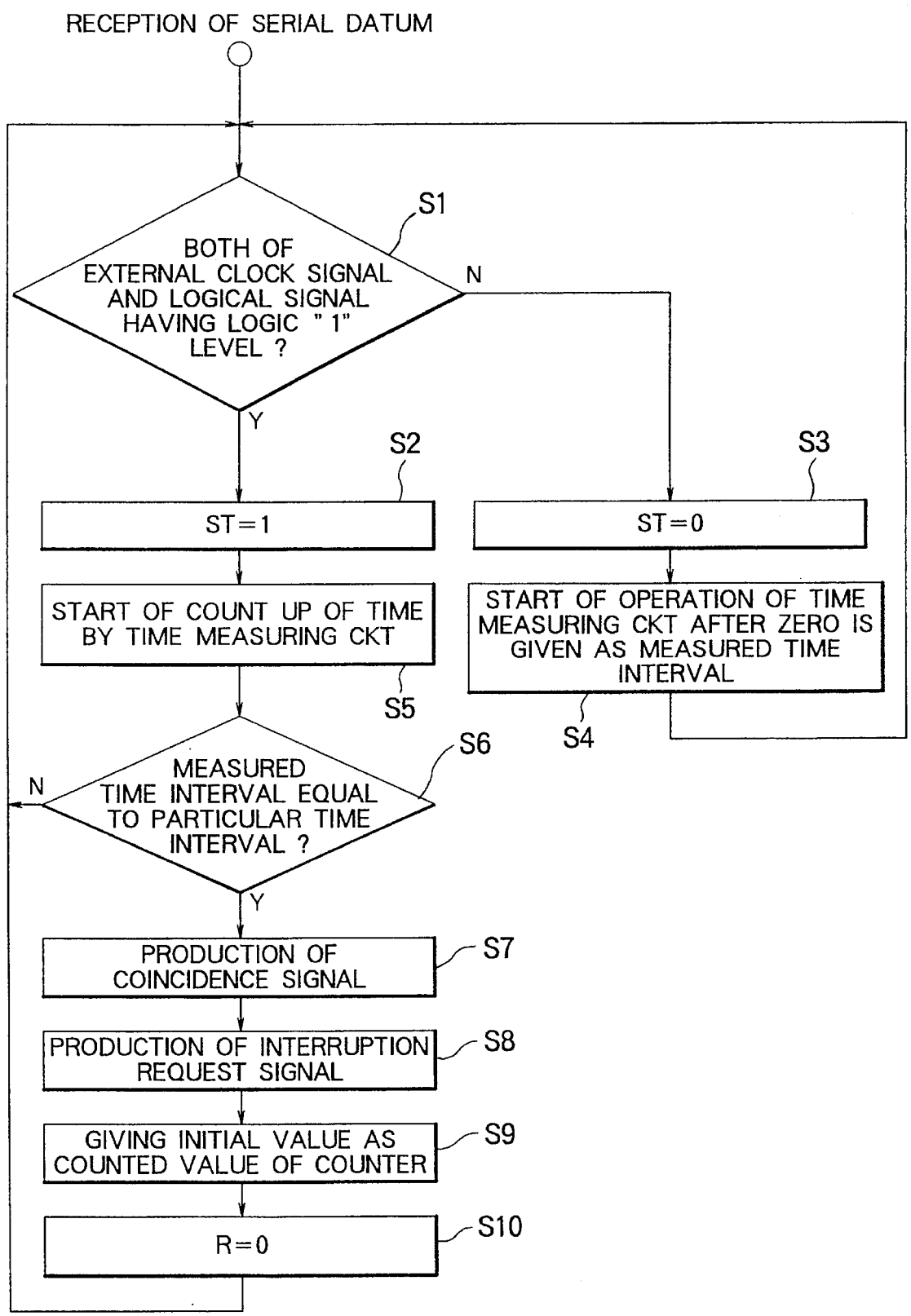
FIG. 4 is a flow chart for use in describing operation of the serial transmission apparatus of FIG. 2.

Referring to FIG. 4 together with FIGS. 2 and 3, the description will be made as regards operation of the serial transmission apparatus. When received with the serial datum, the operation proceeds to a first stage S1 at which judgement is made about whether or not both of the external clock signal and the logical signal have the logic "1" level. When both of the external clock signal and the logical signal have the logic "1" level, the first stage S1 is followed by a second stage S2 which will later be described. Otherwise, the first stage S1 is followed by a third stage S3 at which the AND gate 24 makes the start signal have the logic "0". The third stage S3 is followed by a fourth stage S4 at which the time measuring circuit 25 has an operation stopped after making the measured time interval become equal to an initial time interval, namely, zero. The fourth stage S4 returns to the first stage S1.

At the second stage S2, the AND gate 24 makes the start signal have the logic "1" in response to the external clock signal and the logical signal. The second stage S2 is followed by a fifth stage S5 at which the time measuring circuit 25 starts a count up of the time. The fifth stage S5 is followed by a sixth stage S6 at which the comparing circuit 27 judges about whether or not the measured time interval is equal to the particular time interval. When the measured time interval is equal to the particular time interval, the sixth stage S6 is followed by a seventh stage S7 which will presently be described. Otherwise, the sixth stage returns to the first stage S1.

At the seventh stage S7, the comparing circuit 27 produces the coincidence signal. The seventh stage S7 is followed by an eighth stage S8 at which the interruption signal producing circuit 18 produces the interruption request signal. The eighth stage S8 is followed by a ninth stage S9 at which the counter 17 makes the counted value become equal to the initial value. The ninth stage S9 is followed by a tenth stage S10 at which the OR gate 23 makes the logical signal have the logic "0". The tenth stage S10 returns to the first stage.

What is claimed is:

1. A serial transmission apparatus responsive to a serial datum represented by a plurality of data bits transmitted in series with a predetermined time interval between transmissions, said serial transmission apparatus comprising:

data memorizing means for receiving said data bits of said serial datum and memorizing said serial datum as a memorized datum;

overflow signal producing means connected to said data memorizing means for producing an overflow signal when said data memorizing means is filled with said memorized datum;

end signal producing means operatively connected to said data memorizing means for producing an end signal when said data memorizing means does not receive said data bits for a period of time greater than said predetermined time interval;

interruption request signal producing means connected to said overflow signal producing means and said end signal producing means for producing an interruption request signal in response to at least one of said overflow signal and said end signal; and data processing means connected to said data memorizing means and said interruption request signal producing means for processing said memorized datum in response to said interruption request signal.

2. A serial transmission apparatus responsive to a serial datum represented by a plurality of data bits transmitted in series with a predetermined time interval between transmissions, said serial transmission apparatus comprising:

a clock input terminal for receiving an original clock signal, said predetermined time interval being determined in accordance with said original clock signal;

clock signal processing means connected to said clock input terminal for processing said original clock signal to produce serial clocks;

a shift register having a predetermined bit length for memorizing said serial datum as a memorized datum within said predetermined bit length;

a counter connected to said clock signal processing means for counting said serial clocks to produce a counted value representing a sum of said serial clocks and producing an overflow signal when said counted value equals a predetermined count value corresponding to said predetermined bit length;

time determining means for determining a particular time interval;

first producing means connected to said clock input terminal and said counter for producing an end signal in accordance with said original clock signal, said counted value, and said particular time interval, said particular time interval being greater than said predetermined time interval, said end signal being representative of an end of said serial datum;

second producing means connected to said counter and said first producing means for producing an interruption request signal in response to at least one of said overflow signal and said end signal; and data processing means connected to said shift register and said second producing means and responsive to said interruption request signal for processing said memorized datum that is memorized in said shift register.

3. A serial transmission apparatus as claimed in claim 2, further comprising a reading bus connected to said counter for enabling transmission of said counted value from said counter.

4. A serial transmission apparatus as claimed in claim 2, wherein said second producing means comprises:

local signal producing means connected to said counter and said first producing means for producing a local signal in response to at least one of said overflow signal and said end signal, said counter being supplied with said local signal to make said counted value become equal to an initial value; and interruption signal producing means connected to said local signal producing means and said data processing means for processing said local signal into said interruption request signal.

5. A serial transmission apparatus as claimed in claim 2, wherein said first producing means comprises:

start signal producing means connected to said clock input terminal and said counter for producing a start signal in response to each of said serial clocks and said counted value;

time measuring means connected to said start signal producing means for measuring a time after production of said start signal to produce a measured time interval corresponding to a lapse of said time; and comparing means connected to said time measuring means, said time determining means, and said second producing means for comparing said measured time interval with said particular time interval to produce a coincidence signal when said measured time interval is equal to said particular time interval, said comparing circuit supplying said coincidence signal as said end signal to said second producing means.

6. A method of processing a serial datum represented by a plurality of data bits transmitted in series with a predetermined time interval between transmissions, said method comprising the steps of:

storing said serial datum in a data memory as a memorized datum;

producing an overflow signal when said data memory is filled with said memorized datum;

producing an end signal when said data memory does not receive said data bits for a period of time greater than said predetermined time interval;

producing an interruption request signal in response to at least one of said overflow signal and said end signal; and processing said memorized datum in response to said interruption request signal.

* * * * *